(12) United States Patent
Targsdorf et al.

(10) Patent No.: US 8,411,721 B2
(45) Date of Patent: Apr. 2, 2013

(54) HIGH-PRECISION SYNCHRONIZATION OF PULSED GAS-DISCHARGE LASERS

(75) Inventors: Andreas Targsdorf, Göttingen (DE); Rainer Desor, Bovenden (DE)

(73) Assignee: Coherent GmbH, Göttingen (DE)

(*) Notice: Subject to any disclaimer, the term of this patent is extended or adjusted under 35 U.S.C. 154(b) by 0 days.

(21) Appl. No.: 13/540,456

(22) Filed: Jul. 2, 2012

(65) Prior Publication Data

US 2012/0269223 A1  Oct. 25, 2012

Related U.S. Application Data

(63) Continuation of application No. 12/852,864, filed on Aug. 9, 2010, now Pat. No. 8,238,400.

(51) Int. Cl.
*H01S 3/00* (2006.01)
*H01S 3/22* (2006.01)
*H01S 3/223* (2006.01)
*H01S 3/097* (2006.01)

(52) U.S. Cl. ............ 372/82; 372/38.02; 372/55; 372/81

(58) Field of Classification Search .............. 372/38.02, 372/38.07, 55, 57, 81, 82
See application file for complete search history.

(56) References Cited

U.S. PATENT DOCUMENTS

| 6,020,723 | A  | 2/2000  | Desor et al. |
| 7,039,086 | B2 | 5/2006  | Fallon et al. |
| 7,308,013 | B2 | 12/2007 | Basting et al. |
| 7,366,213 | B2 | 4/2008  | Govorkov et al. |
| 7,408,714 | B2 | 8/2008  | Windpassinger et al. |
| 2002/0141470 | A1 | 10/2002 | Nakao et al. |

FOREIGN PATENT DOCUMENTS

JP  2005-150526 A  6/2005

OTHER PUBLICATIONS

International Search Report and Written Opinion received for PCT Patent Application No. PCT/EP2011/003887, mailed on Dec. 7, 2011, 11 pages.
Notice of Allowance received for U.S. Appl. No. 12/852,864, mailed on Apr. 13, 2012, 12 pages.

*Primary Examiner* — Armando Rodriguez
(74) *Attorney, Agent, or Firm* — Morrison & Foerster LLP

(57) ABSTRACT

Two excimer lasers have individual pulsing circuits each including a storage capacitor which is charged and then discharged through a pulse transformer to generate an electrical pulse, which is delivered to the laser to generate a light pulse. The time between generation of the electrical pulse and creation of the light pulse is dependent on the charged voltage of the capacitor. The capacitors are charged while disconnected from each other. The generation of the electrical pulses is synchronized by connecting the capacitors together for a brief period after the capacitors are charged to equalize the charging voltages. The capacitors are disconnected from each other before they are discharged.

19 Claims, 3 Drawing Sheets

HIGH-PRECISION SYNCHRONIZATION OF PULSED GAS-DISCHARGE LASERS

PRIORITY

This application is a continuation of U.S. application Ser. No. 12/852,864, filed Aug. 9, 2010, the disclosure of which is incorporated herein by reference.

TECHNICAL FIELD OF THE INVENTION

The present invention relates in general to spatial and temporal overlapping of pulses multiple pulsed gas-discharge lasers. The invention relates in particular to spatial and temporal overlapping of pulses from two or more excimer lasers or molecular-fluorine lasers.

DISCUSSION OF BACKGROUND ART

Excimer lasers are pulsed gas lasers that deliver radiation in the ultraviolet (UV) region of the electromagnetic spectrum. There are applications of such lasers, for example, laser annealing, that would benefit from a pulse-energy greater than available from the highest energy excimer laser presently available. A greater pulse-energy can be supplied by combining the output of two or more excimer lasers. The output of the lasers must be overlapped spatial and temporally. The spatial overlap can be achieved precisely using an arrangement of optical elements, and optical overlap methods are well known in the art.

The temporal overlap is less precise and depends on the precision which operating characteristics of pulsed power supplies, among other factors, can be reproduced from pulse to pulse. Variation of such characteristics leads to temporal variation of the precision of pulse-overlap. This temporal variation is usually referred to by practitioners of the art as jitter. Depending on the pulse duration and on application requirements, there is usually a jitter value that can not be exceeded without compromising the application.

By way of example, in a laser annealing application, it may be required to combine the pulsed output of two excimer lasers having a pulse repetition rate of about 600 Hertz (Hz) and a pulse-duration of about 30 nanosecond (ns) full-width at half-maximum (FWHM), with pulses having a complex temporal pulse-shape. Maintenance of a complex temporal pulse-shape is possible only if the pulses are overlapped precisely in time. The tolerance of an application toward variations in the temporal pulse-shape in the overlapped beam cannot be stated in general, and depends on the sensitivity of the application with respect to the pulse shape. For applications in the laser annealing area, this tolerance level corresponds to jitter of a few nanoseconds, for example less than about 6 ns for the 30 ns pulse-duration.

In order to understand the factors affecting jitter, it is useful to consider characteristics of pulsing circuit arrangements for an excimer laser. A description of one such circuit arrangement is set forth below with reference to FIG. 1, which is a circuit diagram depicting one typical arrangement 10 of circuitry for delivering high voltage pulses to discharge electrodes of an excimer laser.

Here, high-voltage power (HV-IN) power from a high-voltage power supply (HVPS) is supplied to a terminal 12. The power is used to fully charge a storage capacitor C0 to a predetermined voltage, typically between about 1500 and 2300 Volts (V). The capacitor is charged via a magnetic isolator 14. Magnetic isolator 14 includes a diode D2 and a transformer L6, one side which is connected to a switch 16 including an isolated-gate bi-polar transistor (IGBT) and rectifier bridge, and other components (not shown). An inhibit signal can open or close switch 16 as required.

Magnetic isolator 16 switches the impedance value between the HVPS and storage capacitor by a factor of about 50 from a low value to a high value (and vice versa) depending on whether switch 16 is respectively closed or open. The low impedance value is needed to charge capacitor C0 with high precision. The higher impedance value is necessary to protect the power supply from energy reflected back from the laser discharge, which could otherwise cause very high and potentially destructive peak currents through the power supply. Only sufficient description of magnetic isolator 14 is provided here to understand the operation of circuitry 10. A detailed description of the magnetic isolation principle is provided in U.S. Pat. No. 6,020,723, assigned to the assignee of the present invention, and the complete disclosure of which is hereby incorporated herein by reference.

When charging of capacitor C0 is complete, magnetic isolator 14 is switched to the high impedance condition. Discharging of capacitor C0 is controlled by an IGBT and diode ("free-wheeling diode"—FWD) module IGBT-1. On receipt of a pulse-trigger voltage at the gate of IGBT-1 the IGBT is closed and capacitor C0 is discharged through a magnetic-assist L5, a pulse-transformer L4, and a diode D1. The resultant pulse from transformer L4 is sent to a pulse-compressor 18. The pulse is compressed in three stages formed by saturable inductor or magnetic switch L1 and capacitor C1, saturable inductor L2 and capacitor C2, and saturable inductor L3 and capacitor C3. The compressed pulse is delivered from pulse compressor 18 to the excimer laser tube which includes the laser discharge electrodes and other electrically reactive components.

A reset signal is applied to terminal 20 from a DC power supply (not shown). The signal causes a current of about 10 amps (A) to flow through L5, L1, L2, and L3. This current effectively drives the magnetic cores of these devices from a position in the B-H (hysteresis) loop thereof following a pulse compression, back into one corner of the B-H loop. A sufficient reset is a precondition for obtaining reproducible transition times between one pulse and the next through the pulse-compressor and minimizing jitter between pulses.

Considering now problems that would be encountered in trying to drive two excimer lasers, each with a circuit arrangement similar to that of arrangement 10 of FIG. 1, one prerequisite for a low jitter time between pulses delivered by the pulse compressor 18 of each is that the charged voltage of storage capacitor C0 of each must be as reproducible as possible from pulse to pulse. These storage capacitors are each charged in approximately 1 millisecond (ms) via the HSVP, which may be regarded as a regulated current source. The achievable control precision (voltage regulation accuracy) of the high voltage of typical such HSVPs is about ±0.1% of the maximum high-voltage value of the power supply, which is usually about unit of 2.3 kilovolts (kV). A typical controlled value is about 1.6 kV, i.e., well below the maximum.

The voltage-time area (the magnetic saturation flux) of transformer cores of stages of pulse compressors 18 is essentially a constant, with only a small drift or variation resulting from a change in temperature of the core material. These variations are sufficiently slow to enable relatively easy correction for example by controlling the relationship of independent discharge-trigger signals of the circuits. The saturation flux ($\Psi$) of a compressor stage can be represented by the following equation:

$$\Psi = N\int 2B_s dA = \int U dt = \text{const.} \quad (1)$$

wherein N represents the number of turns of the respective compressor stage saturable inductor; $B_s$ is the saturation-induction of the core material used; and A is the magnetically-effective core cross-section.

The required time for saturation of the core, and hence transition to a low-inductive state, is obtained from the integral of Udt (the voltage-time area), wherein U is the voltage over this saturable inductivity, which, in turn, is proportional to the charging voltage at the capacitor C0. It follows from this that a variation of this voltage leads directly to a change in the saturation time (the time for the through-connection of the inductances L5, L1, L2, and L3), with the change in time being about 1/U. In the example under consideration, a voltage change of as small as 1 V at capacitor C0 would lead to a time change of between about 5 and 7 ns for the pulse passage through the entire pulse compressor 18.

Because each of the two lasers to be synchronized has an independent high-voltage power supply unit, relative voltage fluctuations in a range of 4.6 V can occur. This would lead to up to 32-ns fluctuations in the time difference between the light pulses delivered by each of the lasers. This is a random pulse-to-pulse phenomenon and can not be predicted, and accordingly can not be corrected.

In theory at least, the above described jitter problem could be rectified by using HVPSs which would allow a pulse to pulse voltage fluctuation (at each C0) of less than about 0.015%. Realization of such power supplies, however, is technologically achievable only with great difficulty and at significant expense. This is because of required high charging power of approximately 50 kilowatts (kW) and charging voltages on the order of 2 kV. There is a need for a solution to the excimer laser synchronization problem that does not require the development of improved power supplies or any other laser components.

SUMMARY OF THE INVENTION

The present invention is directed to electrical apparatus for energizing first and second gas-discharge lasers. In one aspect the apparatus includes first and second storage capacitors and first and second high-voltage power sources arranged to charge respectively the first and second storage capacitors. First and second pulse-forming circuits are arranged to discharge respectively the first and second storage capacitors. The discharging of the capacitors generates respectively first and second electrical pulses which are delivered to respectively the first and second gas discharge lasers. A switching arrangement is provided and arranged to connect together the first and second storage capacitors after the capacitors are charged for a predetermined time period prior to the discharge of the capacitors by the pulse-forming circuits.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
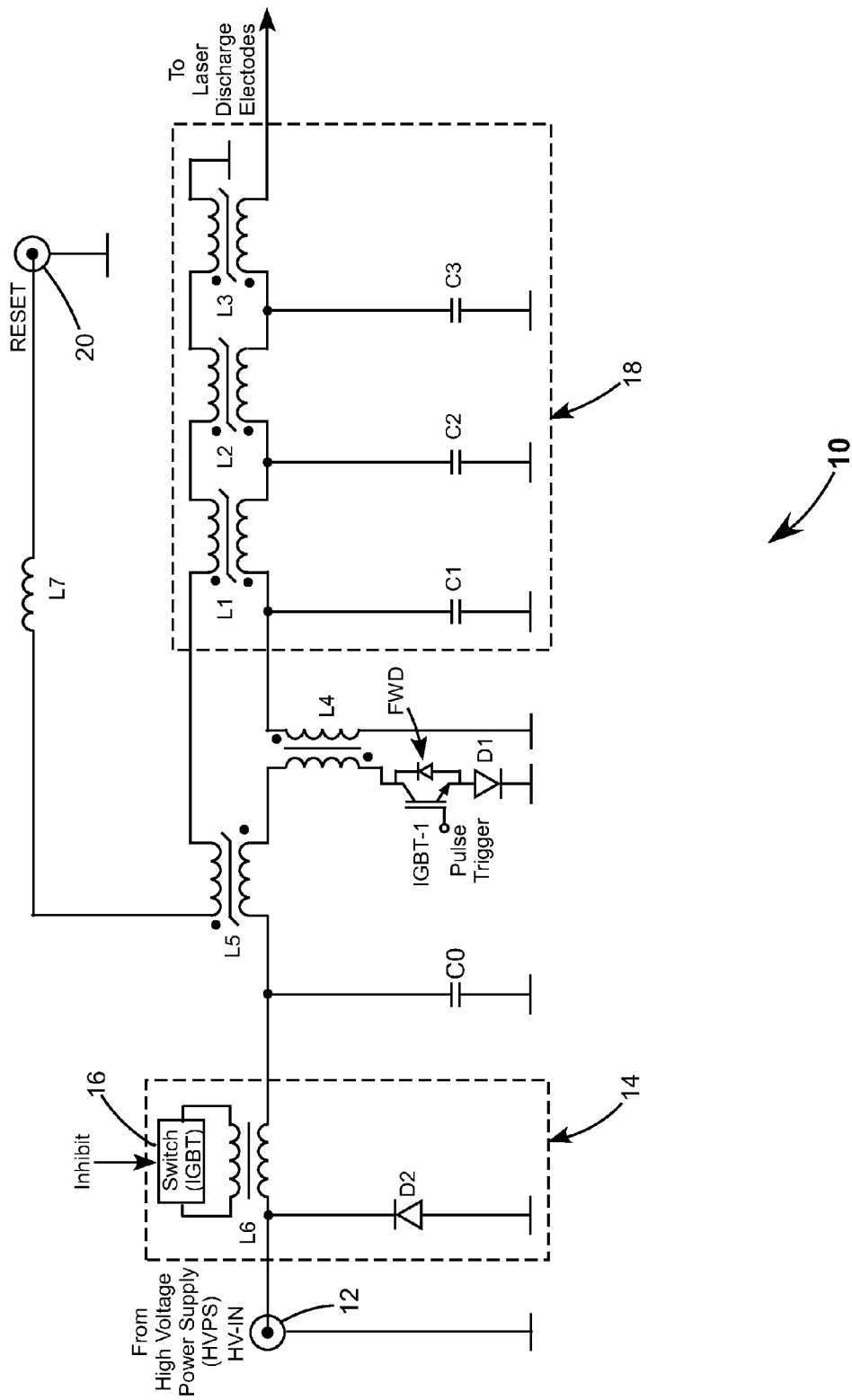
FIG. 1 schematically illustrates a prior-art arrangement for energizing a pulsed gas discharge laser including a storage capacitor charged by a high voltage power supply, and pulse forming circuitry arranged to discharge the capacitor through a pulse transformer to form an electrical pulse, electrically compress the pulse, and deliver the compressed pulse to the gas discharge laser.
Figure 2:
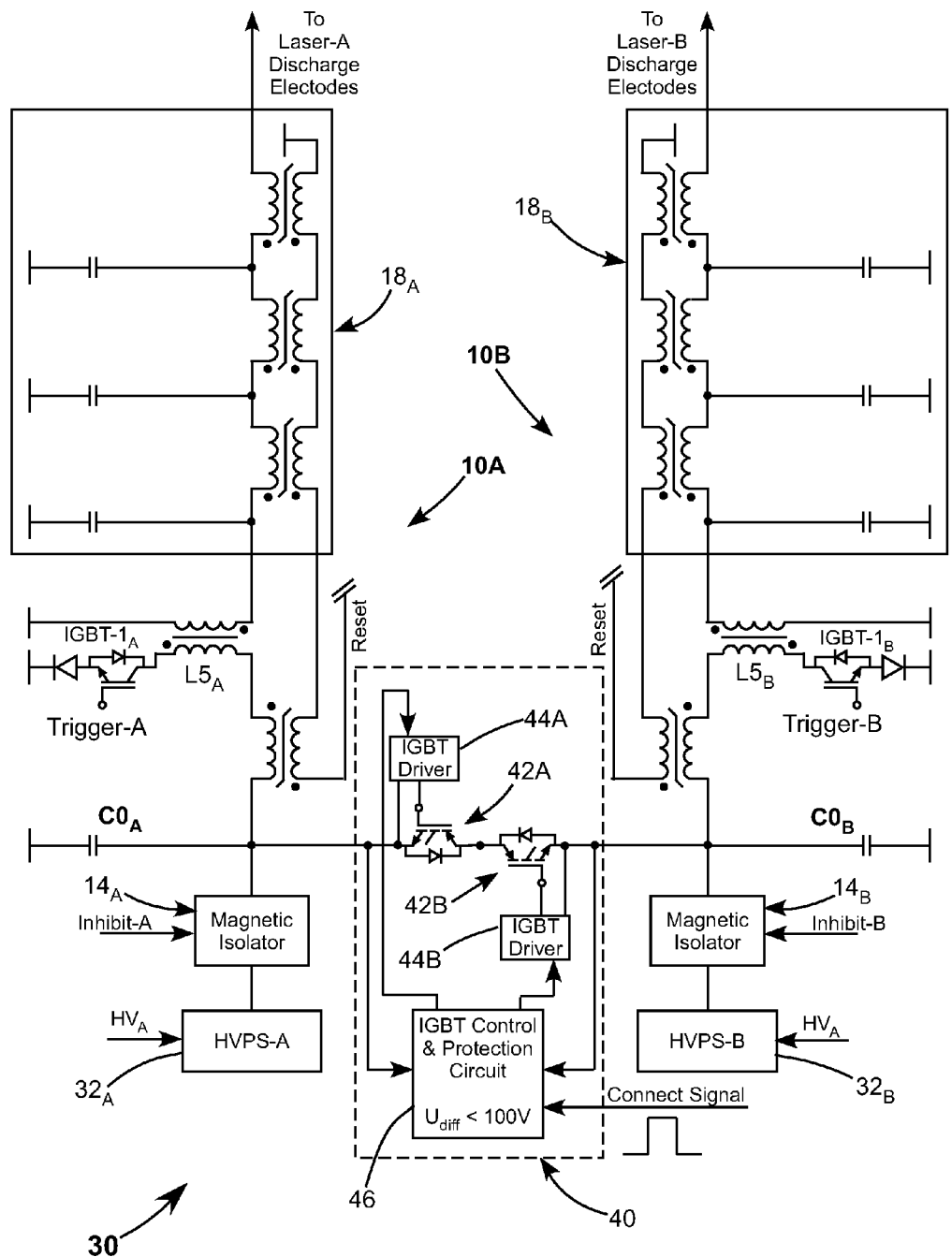
FIG. 2 schematically illustrates apparatus in accordance with the present invention including first and second energizing arrangements each similar to the arrangement of FIG. 1, and an arrangement for temporarily connecting the storage capacitors of each after the capacitors are charged but before the capacitors are discharged.

Continuing now with reference to the drawings, wherein like features are designated by like reference numerals, FIG. 2 is an electrical circuit diagram schematically illustrating a preferred embodiment 10 of apparatus in accordance with the present invention for synchronous operating two excimer lasers (not graphically depicted). The lasers are referred to in FIG. 2 as laser A and laser B. Lasers A and B are energized, individually, by laser pulsing arrangements 10A and 10B respectively, each similar to the above-described prior-art pulsing arrangement 10 of FIG. 1.

Each pulsing arrangement includes a high-voltage power supply 32 charging a storage capacitor C0 ($CO_A$ and $CO_B$) via a magnetic isolator 14. An electrical pulse is generated by commanding IBGT-1, via a trigger-voltage applied to the gate thereof, to discharge capacitor C0 through a pulse transformer L5 (as discussed above). The magnetic pulse compressor 18 temporally compresses the pulse, and delivers the compressed pulse to the laser discharge-electrodes. Common features of the arrangements 10A and 10B are identified by suffixes A and B applied to the corresponding reference numeral. Apparatus 30 is controlled software in a PC or the like (not shown) which provides all control signals referred to hereinbelow.

As discussed above, absent any pulse-to-pulse charging-voltage differences between storage capacitors $CO_A$ and $CO_B$, optimal synchronization of the output of the lasers, and corresponding minimization of jitter, could be accomplished by taking into account the different transit-times for a pulse generated by discharge of a capacitor, and by synchronizing pulse-trigger signals Trigger-A and Trigger-B.

In apparatus 30, fluctuations of pulse-to-pulse charging-voltage differences are minimized, as summarized above, by connecting capacitors $CO_A$ and $CO_B$, together, after the capacitors are charged, for a short period before a pulse is triggered by either Trigger-A or Trigger-B. The connection is established by a switching arrangement 40 including IGBT modules 42A and 42B, which are driven by drivers 44A and 44B respectively. An IGBT protection and control circuit 46 generates digital signals for the drivers, responsive to a digital connect signal from the software controlling the apparatus. Circuitry 46 also monitors the voltages of capacitors and is arranged to prevent turning on IGBTs 42A and 42B if the voltage difference between the capacitors exceeds a predetermined level, for example 100 V. This serves to protect the IGBTs in the event that one of HSVPs malfunctions, and the corresponding capacitor is not charged or not sufficiently charged. Circuitry 40 can be referred to as an "equilibrium switch" or EQUI-Switch.

IGBTs 42A and 42B are connected as depicted in FIG. 2 in an anti-serial manner. This provides that the IGBTs are able to switch both positive and negative polarities of the capacitors.

This also provides that lasers A and B can be operated separately from each other, and be independent of the relative adjustment of power supplies HVPS-A and HVPS-B.

The power supplies are regulated such that one of the capacitors, for example capacitor $CO_A$, is initially charged to a higher voltage than the other ($CO_B$). In general terms, the voltage difference must be high enough, so that under worst condition the difference is still higher than sum of the flux voltage of one IGBT switch plus the flux voltage of the internal freewheeling diode of the other (anti-serial) IGBT and the residual voltage difference at which the HVPS with the lower voltage takes advantage of the fluctuation upward and the power supply unit with the higher voltage takes advantage of the fluctuation downward, i.e., the voltage-regulation accuracy of the power supplies. As noted above, this is about 4.6 V (±2.3 V) in the example under consideration. Only under this condition will there always be charge equalization, with the equalization current always flowing in the same direction. The voltage difference, however, should not be too high, otherwise the equalization may take longer than is practical (>100 μs in this example) or the equalization current may be too high. A voltage about 15 V higher has been determined to be adequate, in the example under consideration.

The impedance (R) of the connection between $CO_A$ and $CO_B$ is chosen (if necessary, by putting additional resistance in series with IGBTs 42A and 42B) to satisfy a condition $$R \geq 2*(L/C)^{0.5} \quad (2)$$

where L is mainly cable inductance and $$C = CO_A * CO_B / (CO_A + CO_B) \quad (3)$$

The resulting equalizing current of several tens of amps ensures that voltages of capacitors $CO_A$ and $CO_B$ adjust aperiodically, within approximately 50 microseconds (μs), up to the flux voltages of the IGBT operated in the forward current direction and of the internal freewheeling diode of the other respective IGBT.

Although, as noted above, a residual voltage determined by the regulation accuracy of the HVPSs always remains as the difference in the two charging capacitor voltages, it is reproducible and does not contribute to the temporal jitter. Because of this, the charge voltages of $CO_A$ and $CO_B$ still fluctuate absolutely by about ±2.3 V, but relative to each other by less than 200 mV. This means that, although the gas discharges and, as a result, the light pulses of lasers A and B jitter against the discharge trigger signal of each, the lasers achieve a temporal stability in the nanosecond range relative to each other. Realizable values lie between about 2 ns and 5 ns peak-peak. Accordingly, the temporal shape of the two spatially and temporally overlapped light pulses, largely corresponds to the temporal shape of the individual pulses. This provides that interaction of the overlapped pulses with a material being processed thereby takes place in the same manner as for any one of the individual pulses having twice the energy.

Figure 3:
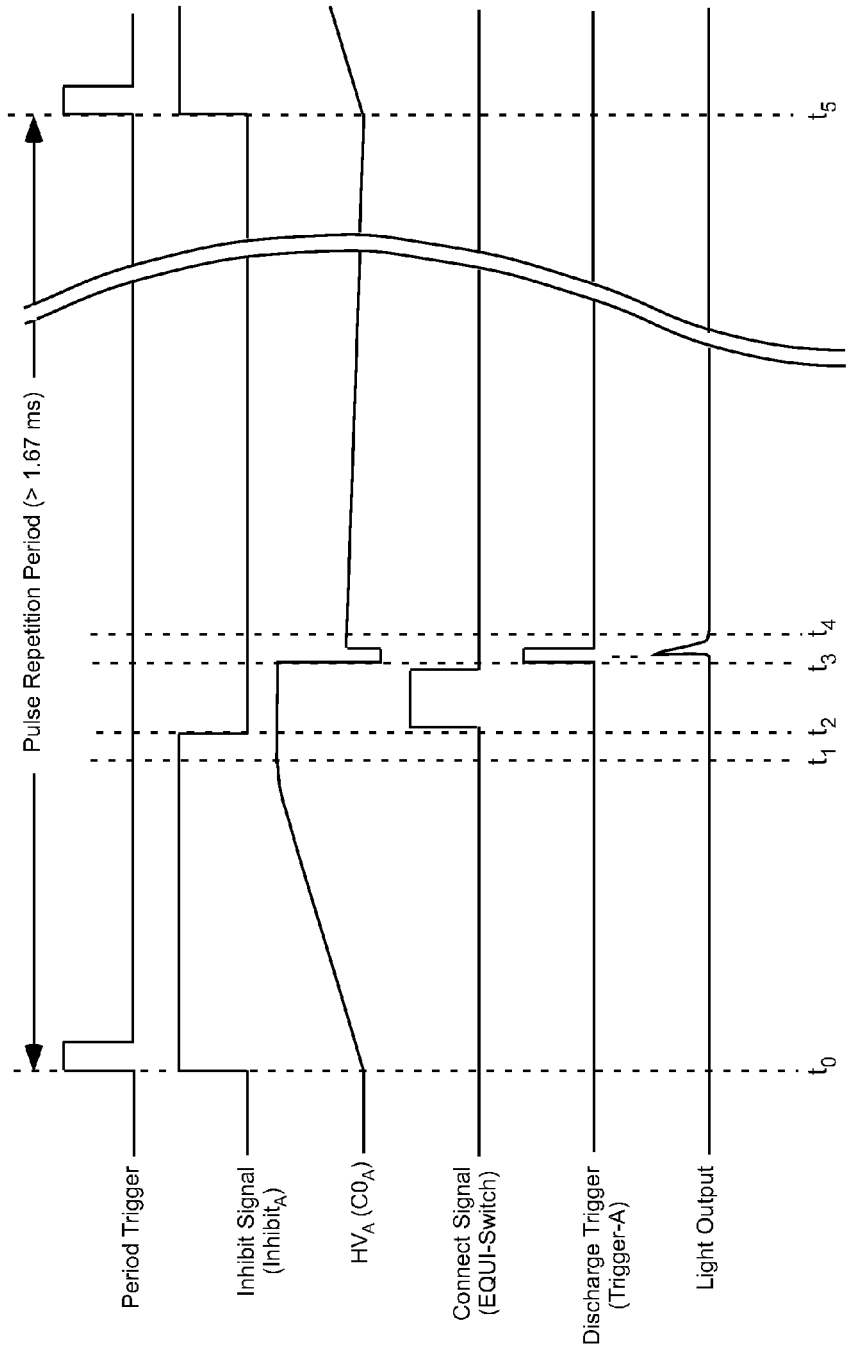
FIG. 3 is a timing diagram schematically illustrating one example of the operation of the apparatus of FIG. 2.

A description of the relative timing of signals operating apparatus 30 as discussed above is next set forth with reference to the timing diagram of FIG. 3 and with continuing reference to FIG. 2. As noted above, these signals are generated or triggered by control software for apparatus 30. In FIG. 3, with an exception of the connection signal, all signals or values are specific to one of the lasers, here, arbitrarily selected as laser A. Signals and values for the other laser will temporally evolve in the same manner. The evolution time of the diagram of FIG. 3 is slightly greater that one pulse-repetition period, here, assumed to be greater than about 1.67 milliseconds (ms) representative of a pulse repetition frequency of 600 Hz or less.

The control software generates a period trigger signal at time $t_0$, by which all others are timed. At time $t_0$, the inhibit signal (Inhibit A) applied to magnetic isolator 14A goes from low to high, putting the isolator in a low impedance state to facilitate charging. At this time also, a signal HVA commands power supply HVPS-A to charge capacitor $CO_A$ to the predetermined voltage for that capacitor. The capacitor is nominally charged at a time $t_1$, but charging continues to a time $t_2$ to take into account possible pulse-to-pulse differences in charging time. Values for the period $t_0$ to $t_1$ and $t_1$ to $t_2$ consistent with the example under consideration are less than or equal to about 1040 microseconds (μs) and 100 μs respectively. At time $t_2$ the inhibit signal goes from high to low, putting the magnetic isolator in a high impedance state to effectively isolate capacitor $CO_A$ from power supply HVPS-A.

A relatively short time after time $t_2$, for example, about 10 μs after, the connect signal goes from low to high, closing IGBTs 42A and 42B (the EQUI-Switch) so that the above-described voltage equalization between capacitors $CO_A$ and $CO_B$ can take place. A relatively short time before time $t_3$ (here again about 10 μs), the connect signal goes from high to low opening EQUI-Switch and isolating the capacitors from each other so that capacitors can be independently discharged. At time $t_3$, the trigger signal closes IGBT-1A for a period long enough to discharge capacitor $CO_A$, an electrical pulse (not shown) is generated and compressed, and corresponding light output pulse is delivered from the laser a few microseconds later. During a recovery period between times t3 and t4, after IGBT-1A is re-opened the voltage of capacitor $CO_A$ jumps up slightly, due to charging by reflected energy from the discharge due to less than perfect impedance matching, then drifts gradually down to about the original uncharged value by time $t_5$ at which time a new sequence of signals is triggered. Here, it should be noted that for a PRF of 600 Hz the time period between t4 and t5 would be relatively short. However, recharging could actually start at time t4.

A reason for closing the EQUI-Switch shortly after time $t_3$ and opening the EQUI-switch shortly before time $t_3$ is that the EQUI-Switch is common to both lasers. The difference in the EQUI-Switch closed time (about 100 μs) and the period $t_3-t_2$ allows for the relative trigger times of the lasers to be varied to compensate for any above-discussed relative drift in pulse-propagation time through pulse-compression circuits 18A and 18B, thereby optimizing temporal overlap of the corresponding light pulses.

It is emphasized, here, that the embodiment of the present invention described above and circuitry and values used are merely one example and should not be construed as limiting the present invention. Those skilled in the electrical arts, from the description of the present invention provided above, may devise other circuitry for providing the inventive voltage-equalization function without departing from the spirit and scope of the present invention. Further, while the present invention has been described in terms of synchronizing the output of two lasers with independent pulsing arrangements, the invention could be extended to synchronizing three or more lasers with independent pulsing arrangements. By way of, example, three lasers with independent pulsing arrangements could be synchronized using two of the EQUI-switch arrangements described herein.

In summary, the present invention is described above in terms of a preferred embodiment. The invention however is not limited to the embodiment described herein. Rather the invention is limited only by the claims appended hereto.

What is claimed is:

1. A laser system comprising:
    a first laser tube holding a gas and discharge electrodes;
    a second laser tube holding a gas and discharge electrodes;
    a first circuit including a first storage capacitor and first power supply for charging the first capacitor and wherein the first circuit delivers excitation pulses to the discharge electrodes in the first laser tube in response to the discharge of the first capacitor;
    a second circuit including a second storage capacitor and second power supply for charging the second capacitor and wherein the second circuit delivers excitation pulses to the discharge electrodes in the second laser tube in response to the discharge of the second capacitor; and
    at least one switch arranged to electrically couple the first and second storage capacitors together prior to the discharge thereof to reduce any differences in the charging voltages of the first and second capacitors.

2. The apparatus of claim 1, wherein the first and second capacitors are decoupled before the capacitors are discharged.

3. The apparatus of claim 2, wherein the first and second capacitors are not coupled together during the charging thereof and the power supplies are arranged to charge the capacitors to respectively first and second voltages before the coupling together thereof.

4. The apparatus of claim 3, wherein the first voltage is greater than the second voltage.

5. The apparatus of claim 4, wherein the power supplies are arranged so that each time the capacitors are coupled, the current will only flow from the first capacitor to the second capacitor.

6. The apparatus of claim 1, wherein the at least one switch includes first and second IGBT-diode modules connected in an anti-serial manner with each other and with the first and second IGBT-diode modules connected respectively with the first and second capacitors.

7. The apparatus of claim 6, wherein the first and second storage capacitors are connected and disconnected by respectively, closing and opening the IGBT-diode modules.

8. A laser system comprising:
    a first laser tube holding a gas and discharge electrodes;
    a second laser tube holding a gas and discharge electrodes;
    a first circuit including a first storage capacitor and first power supply for charging the first capacitor and wherein the first circuit delivers excitation pulses to the discharge electrodes in the first laser tube in response to the discharge of the first capacitor;
    a second circuit including a second storage capacitor and second power supply for charging the second capacitor and wherein the second circuit delivers excitation pulses to the discharge electrodes in the second laser tube in response to the discharge of the second capacitor; and
    means for electrically coupling the first and second storage capacitors together after being charged and before being discharged to reduce any differences in the charging voltages of the first and second capacitors.

9. The apparatus of claim 8, wherein the first and second capacitors are decoupled before the capacitors are discharged.

10. The apparatus of claim 9, wherein the power supplies are arranged to charge the first and second capacitors to respectively first and second voltages before the coupling together thereof, wherein the first voltage is greater than the second voltage so that during each time the capacitors are coupled, the current will only flow from the first capacitor to the second capacitor.

11. The apparatus of claim 8, wherein said coupling means includes first and second IGBT-diode modules connected in an anti-serial manner with each other and with the first and second IGBT-diode modules connected respectively with the first and second capacitors.

12. The apparatus of claim 11, wherein the first and second storage capacitors are connected and disconnected by respectively, closing and opening the IGBT-diode modules.

13. A method of laser annealing wherein the laser output pulses of two excimer laser are spatially and temporally overlapped, each said excimer laser having an electrical pulse supply circuit, each said pulse supply circuit including a capacitor comprising the steps of:
    charging the capacitors;
    electrically coupling the capacitors together to reduce any difference in the charges on the capacitors;
    discharging the capacitors to supply pulses to the respective excimer lasers to generate laser output pulses; and
    spatially and temporally overlapping the pulses from the respective excimer lasers to facilitate annealing.

14. A method as recited in claim 13 wherein the step of coupling the capacitors is performed after the capacitors are charged.

15. A method as recited in claim 14 wherein the capacitors are decoupled before the capacitors are discharged.

16. A method as recited in claim 15 wherein the capacitors for the two lasers are charged from two separate power suppliers.

17. A method as recited in claim 13 wherein the capacitors are charged to different voltage levels and wherein each time the capacitors are coupled, the current will only flow from one of the capacitors to the other capacitor.

18. A method of controlling the output from two gas lasers, each gas laser having an electrical pulse supply circuit, each said pulse supply circuit including a capacitor comprising the steps of:
    independently charging the capacitors from two separate power supplies;
    after the capacitors are charged, electrically coupling the capacitors together to reduce any difference in the charges on the capacitors;
    thereafter, uncoupling the capacitors; and
    thereafter discharging the capacitors to supply pulses to the respective gas lasers to generate laser output pulses.

19. A method as recited in claim 18 wherein the capacitors are charged to different voltage levels and wherein each time the capacitors are coupled, the current will only flow from one of the capacitors to the other capacitor.

* * * * *